United States Patent
Nishikawa et al.

(10) Patent No.: US 9,832,766 B2
(45) Date of Patent: *Nov. 28, 2017

(54) RADIO BASE STATION APPARATUS, MOBILE TERMINAL APPARATUS AND RADIO COMMUNICATION METHOD

(71) Applicant: NTT DOCOMO, INC., Tokyo (JP)

(72) Inventors: Daisuke Nishikawa, Tokyo (JP); Kazuaki Takeda, Tokyo (JP); Tetsushi Abe, Tokyo (JP); Yoshihisa Kishiyama, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/400,390

(22) Filed: Jan. 6, 2017

(65) Prior Publication Data
US 2017/0127389 A1  May 4, 2017

Related U.S. Application Data

(63) Continuation of application No. 13/877,614, filed as application No. PCT/JP2011/072745 on Oct. 3, 2011, now Pat. No. 9,629,149.

(30) Foreign Application Priority Data

Oct. 14, 2010 (JP) .................................. 2010-225227
Nov. 8, 2010 (JP) .................................. 2010-249764

(51) Int. Cl.
*H04W 72/04* (2009.01)
*H04L 5/00* (2006.01)
*H04W 72/14* (2009.01)

(52) U.S. Cl.
CPC ......... *H04W 72/042* (2013.01); *H04L 5/0053* (2013.01); *H04W 72/14* (2013.01)

(58) Field of Classification Search
None
See application file for complete search history.

(56) References Cited

U.S. PATENT DOCUMENTS

2009/0042616 A1 2/2009 Teo et al.
2010/0098012 A1 4/2010 Bala et al.
(Continued)

FOREIGN PATENT DOCUMENTS

CN 101617489 A 12/2009
EP 2 023 503 A2 2/2009
(Continued)

OTHER PUBLICATIONS

International Search Report issued in PCT/JP2011/072745 dated Nov. 8, 2011 (4 pages).
(Continued)

*Primary Examiner* — Charles C Jiang
*Assistant Examiner* — Rose Clark
(74) *Attorney, Agent, or Firm* — Osha Liang LLP

(57) ABSTRACT

A radio communication method for a radio base station, apparatus that controls transmission of an aperiodic SRS (Sounding Reference Signal) by a mobile terminal apparatus is described. The radio communication method includes selecting a specific bit information piece to report to the mobile terminal apparatus, from a table having four bit information pieces including one bit information piece to indicate not to trigger the aperiodic SRS and three bit information pieces to indicate to transmit the aperiodic SRS using first to third default SRS parameters respectively, the four bit information pieces all being defined in a 2-bit bit field in downlink control information to be transmitted in one subframe, and transmitting, to the mobile terminal
(Continued)

apparatus; the first to third default SRS parameters by higher layers and the specific bit information piece by a downlink control channel.

6 Claims, 15 Drawing Sheets

(56) References Cited

U.S. PATENT DOCUMENTS

| | | |
|---|---|---|
| 2010/0246561 A1 | 9/2010 | Shin et al. |
| 2011/0085458 A1 | 4/2011 | Montojo et al. |
| 2011/0142095 A1 | 6/2011 | Guo et al. |
| 2011/0199944 A1 | 8/2011 | Chen et al. |
| 2011/0274063 A1 | 11/2011 | Li |
| 2012/0076115 A1 | 3/2012 | Noh et al. |
| 2012/0106471 A1 | 5/2012 | Behraven et al. |
| 2012/0281625 A1 | 11/2012 | Noh et al. |
| 2013/0058306 A1 | 3/2013 | Noh et al. |
| 2013/0182674 A1 | 7/2013 | Lunttila et al. |
| 2013/0194908 A1 | 8/2013 | Gao et al. |
| 2013/0201946 A1 | 8/2013 | Lunttila et al. |
| 2014/0036859 A1 | 2/2014 | Ekpenyong et al. |

FOREIGN PATENT DOCUMENTS

| | | |
|---|---|---|
| JP | 2010-034624 A | 2/2010 |
| WO | 2008/120925 A1 | 10/2008 |

OTHER PUBLICATIONS

Patent Abstracts of Japan for Japanese Publication No. 2010-034624, publication date Feb. 12, 2010 (1 page).
Panasonic, "SRS enhanced for LTE-Advanced"; 3GPP TSG RAN WG1 Meeting #60bis; R1-102040; Beijing, China; Apr. 12-16, 2010 (3 pages).
Texas Instruments, "Signaling considerations for dynamic aperiodic SRS"; 3GPP TSG RAN WG1 #61; R1-102830; Montreal, Canada; May 10-14, 2010 (4 pages).
ZTE, "On dynamic aperiodic SRS in LTE-A"; 3GPP TSG RAN WG1 #61bis; R1-103604; Dresden, Germany; Jun. 28-Jul. 2, 2010 (4 pages).
ZTE, "On dynamic aperiodic SRS in LTE-A"; 3GPP TSG-RAN WG1 #62; R1-104676; Madrid, Spain; Aug. 23-27, 2010 (5 pages).
Samsung, "SRS Transmission Issues in LTE-A"; 3GPP TSG RAN WG1 #57; R1-091879; San Francisco, USA; May 4-8, 2009 (3 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).
3GPP TR 36.213 V8.7.0; "3rd Generation Partnership Project; Technical Specification Group Radio Access Network; Evolved Universal Terrestrial Radio Access (E-UTRA); Physical Layer Procedures (Release 8)"; May 2009 (77 pages).
Decision to Grant a Patent issued in counterpart Japanese Patent Application No. JP2011-287466, dated May 27, 2014 (4 pages).
Office Action in related U.S. Appl. No. 14/558,107, dated Jan. 20, 2016 (22 pages).
Extended European Search Report issued in the counterpart European Application No. 11 83 0614.1, dated Apr. 8, 2015 (7 pages).
Extended European Search Report issued in the counterpart European Application No. 14 19 4910.7, dated Apr. 8, 2015 (9 pages).
Office Action issued in the counterpart Taiwanese Patent Application No. 103119015, dated Jun. 15, 2015 (5 pages).

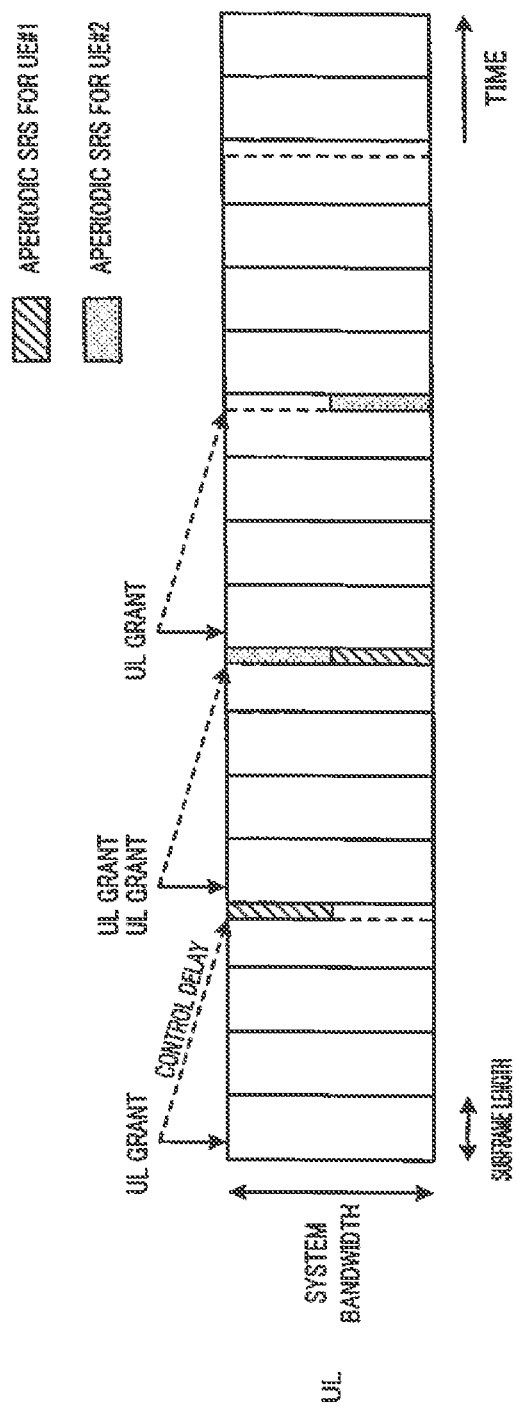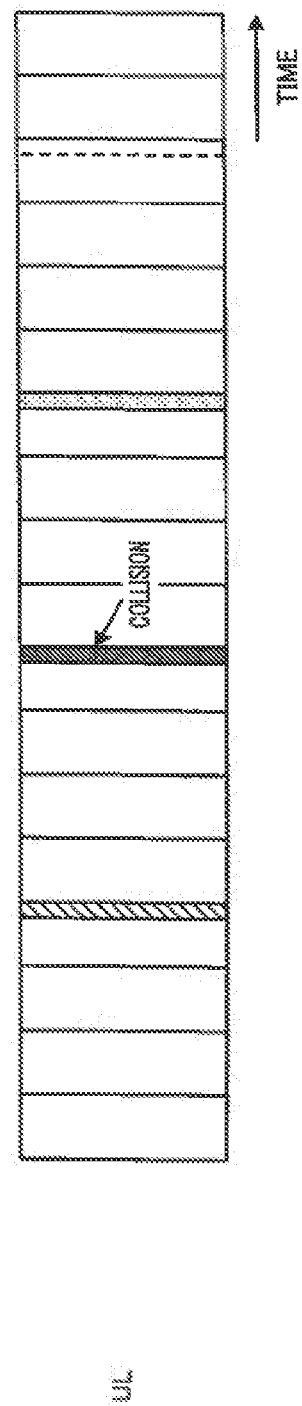
FIG. 3A CASE1 (IN CASE OF NARROWBAND SRS)
FIG. 3B CASE2 (IN CASE OF WIDEBAND SRS)

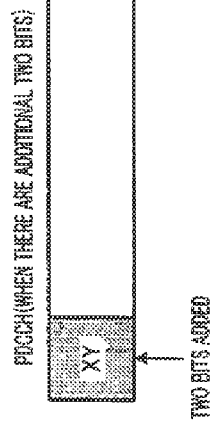

| BIT | SRS TRANSMISSION CONTENT |
|---|---|
| 00 | A-SRS NOT TRANSMITTED |
| 01 | TRANSMIT BY COMB 0 |
| 10 | TRANSMIT BY COMB 1 |
| 11 | N/A |

FIG. 4A

| BIT | SRS TRANSMISSION CONTENT |
|---|---|
| 00 | A-SRS NOT TRANSMITTED |
| 01 | TRANSMIT IN FREQUENCY POSITION 0 |
| 10 | TRANSMIT IN FREQUENCY POSITION 1 |
| 11 | TRANSMIT IN FREQUENCY POSITION 2 |

FIG. 4B

| BIT | SRS TRANSMISSION CONTENT |
|---|---|
| 00 | A-SRS NOT TRANSMITTED |
| 01 | TRANSMIT BY CS 0 |
| 10 | TRANSMIT BY CS 1 |
| 11 | TRANSMIT BY CS 2 |

FIG. 4C

| BIT | SRS TRANSMISSION CONTENT |
|---|---|
| 00 | A-SRS NOT TRANSMITTED |
| 01 | TRANSMIT BY DEFAULT |
| 10 | TRANSMIT BY SHIFTING CS FROM DEFAULT BY VALUE OF x |
| 11 | TRANSMIT BY SHIFTING CS FROM DEFAULT BY VALUE OF y |

FIG. 4D

| BIT | SRS TRANSMISSION CONTENT |
|---|---|
| 00 | A-SRS NOT TRANSMITTED |
| 01 | TRANSMIT BY DEFAULT |
| 10 | TRANSMIT BY DIFFERENT COMB FROM DEFAULT |
| 11 | TRANSMIT BY SHIFTING CS FROM DEFAULT BY VALUE OF x |

FIG. 4E

| BIT | SRS TRANSMISSION CONTENT |
|---|---|
| 00 | A-SRS NOT TRANSMITTED |
| 01 | TRANSMIT BY DEFAULT a |
| 10 | TRANSMIT BY DEFAULT b |
| 11 | TRANSMIT BY DEFAULT c |

FIG. 4F

| BIT | SRS TRANSMISSION CONTENT |
|---|---|
| 00 | A-SRS NOT TRANSMITTED |
| 01 | TRANSMIT BY DEFAULT a |
| 10 | TRANSMIT BY DEFAULT b |
| 11 | TRANSMIT BY DEFAULT c |

FIG. 13B  DCI FORMAT 4
(WHEN THERE ARE TWO BITS)

| BIT | SRS TRANSMISSION CONTENT |
|---|---|
| 0 | A-SRS NOT TRANSMITTED |
| 1 | TRANSMIT BY DEFAULT x |

FIG. 13A  DCI FORMAT 0

| BIT | SRS TRANSMISSION CONTENT |
|---|---|
| 000 | A-SRS NOT TRANSMITTED |
| 001 | TRANSMIT BY DEFAULT |
| 010 | TRANSMIT BY SHIFTING CS FROM DEFAULT BY VALUE OF X |
| 011 | TRANSMIT BY SHIFTING CS FROM DEFAULT BY VALUE OF Y |
| 100 | TRANSMIT BY SHIFTING CS FROM DEFAULT BY VALUE OF Z |
| 101 | TRANSMIT BY DIFFERENT COMB FROM DEFAULT |
| 110 | TRANSMIT BY DIFFERENT COMB FROM DEFAULT + SHIFTING CS BY VALUE OF X |
| 111 | TRANSMIT BY DIFFERENT COMB FROM DEFAULT + SHIFTING CS BY VALUE OF Y |

FIG. 14B WHEN THERE ARE THREE BITS

| BIT | SRS TRANSMISSION CONTENT |
|---|---|
| 00 | A-SRS NOT TRANSMITTED |
| 01 | TRANSMIT BY DEFAULT a |
| 10 | TRANSMIT BY DEFAULT b |
| 11 | TRANSMIT BY DEFAULT c |

FIG. 14A WHEN THERE ARE TWO BITS

RADIO BASE STATION APPARATUS, MOBILE TERMINAL APPARATUS AND RADIO COMMUNICATION METHOD

CROSS-REFERENCE TO RELATED APPLICATIONS

The present application is a continuation application of and, thereby, claims benefit under 35 U.S.C. §120 to U.S. patent application Ser. No. 13/877,614 filed on Apr. 3, 2013, titled, "RADIO BASE STATION APPARATUS, MOBILE TERMINAL APPARATUS AND RADIO COMMUNICATION METHOD," which is a national stage application of PCT Application No. PCT/JP2011/072745, filed on Oct. 3, 2011, which claims priority to Japanese Patent Application No. 2010-225227 filed on Oct. 4, 2010 and Japanese Patent Application No. 2010-249764 filed on Nov. 8, 2010. The contents of the priority applications are incorporated by reference in their entirety.

TECHNICAL FIELD

The present invention relates to a radio base station apparatus, a mobile terminal apparatus and a radio communication method. More particularly, the present invention relates to a radio base station apparatus, a mobile terminal apparatus and a radio communication method in a next-generation radio communication system.

BACKGROUND ART

In a UMTS (Universal Mobile Telecommunications System) network, for the purposes of improving spectral efficiency and improving data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, non-patent literature 1).

In the third-generation mobile communication system, it is possible to achieve a transmission rate of maximum approximately 2 Mbps on the downlink by using a fixed band of approximately 5 MHz. Meanwhile, in a system of the LTE scheme (LTE system), it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A)). For example, in LTE-A, there is a plan to expand the maximum systems band for LTE specifications, which is 20 MHz, to approximately 100 MHz on the downlink and to approximately 40 to 60 MHz on the uplink.

Now, in the LTE system, measuring uplink channel quality in a radio base station apparatus (BS: Base Station) based on an SRS (Sounding Reference Signal) that is provided for channel quality measurement and that is transmitted from a mobile terminal apparatus (UE: User Equipment) is under study (see, for example, non-patent literature 2). In this case, the radio base station apparatus performs scheduling to allow the mobile terminal apparatus to transmit an uplink shared channel (PUSCH: Physical Uplink Shared CHannel) signal based on the channel quality measurement result, and issues a command using a downlink control channel. (PDCCH: Physical Downlink Control CHannel). In release-8 LTE, the SRS is multiplexed on the last symbols of subframes constituting an uplink radio frame, and is transmitted periodically from the mobile terminal apparatus to the radio base station apparatus.

CITATION LIST

Non-Patent Literature

Non-Patent Literature 1: 3GPP, TR 25.912 (V7.1.0), "Feasibility Study for Evolved UTRA and UTRAN," September 2006

Non-Patent Literature 2: 3 GPP, TS 36.213 (V8.7.0), "Evolved Universal Terrestrial Radio Access (E-UTRA); Physical Layer Procedures (Release 8)," May 2009

SUMMARY OF INVENTION

Technical Problem

However, in the LTE system, even when there is no PUSCH signal to transmit from the mobile terminal apparatus on the uplink, the SRS is transmitted periodically to the radio base station apparatus. Consequently, radio resources to be used for SRS transmission are occupied on a fixed basis regardless of whether or not there is a PUSCH signal, which raises a problem of difficulty in using radio resources efficiently.

FIG. 12 is a diagram for explaining the SRS transmission method in the LTE system. As shown in FIG. 12, in the LTE system, the SRS for channel quality measurement is multiplexed on the last symbols of subframes (subframes #n to #n+9) constituting an uplink (UL: Uplink) radio frame, and is periodically transmitted from the mobile terminal apparatus to the radio base station apparatus. FIG. 12 shows a case where the SRS is multiplexed on the last symbols of subframes #n+1 and #n+6 based in an SRS transmission period of 5 msec.

Meanwhile, when an uplink (UL) scheduling grant included in the PDCCH is reported, four TTIs (Transmission Time Intervals) later, a PUSCH signal is transmitted on the uplink. Note that the uplink scheduling grant relates to an uplink shared channel, and includes uplink resource block allocation information, UE ID, data size, modulation scheme, uplink transmission power information, and information about the uplink MI MO demodulation reference signal, and so on.

A subframe is the transmission time unit of one data packet having been subjected to error correction coding (channel coding), and equals one TTI. Consequently, when a UL scheduling grant is reported, the PUSCH is transmitted four subframes later. FIG. 12 shows a case where UL scheduling grants are reported in subframes #m to #m+2 and #m+4, amongst the subframes (subframes #m to #m+9) constituting a downlink (DL: Downlink) radio frame, and where, in response to these UL scheduling grants, PUSCH signals are transmitted in uplink (UL) subframes #n+4 to #n+6 and #n+8.

As shown in FIG. 12, given that the SRS is transmitted regardless of whether or not there is a PUSCH signal to transmit in each subframe, if no UL scheduling grant is reported and therefore no PUSCH signal is transmitted, the SRS is still transmitted on the uplink (UL), periodically, to the radio base station apparatus. From the perspective of efficient use of radio resources, it is preferable to measure the SRS, which is provided for the purpose of measuring channel quality in the radio base station apparatus, when a PUSCH signal is transmitted. However, in the LTE system, radio resources to be used for SRS transmission are occupied on a fixed basis, regardless of whether or not there is a PUSCH signal, efficient use of radio resources is made difficult. Furthermore, in LTE-A, UL multi-antenna transmission by a mobile terminal apparatus having a plurality of antennas is under study, and, given that SRS resources for a plurality of antennas will be required, demand for even more efficient use of radio resources is anticipated.

To solve this problem, for example, in LTE-A, it may be possible to adopt an aperiodic SRS, which controls SRS transmission timing at arbitrary timing.

However, when an aperiodic SRS is adopted, it is necessary to adequately transmit information to control as to whether or not there is an SRS trigger (transmission timing), and SRS transmission control information such as SRS parameters (comb, frequency position, cyclic shift number, bandwidth and so on) to control the specific transmission conditions when the SRS is transmitted, and so on, to the mobile terminal apparatus.

The present invention has been made in view of the above problems, and it is therefore an object of the present invention to provide a radio base station apparatus, a mobile terminal apparatus and a radio communication method, whereby, when an aperiodic SRS is adopted, it is possible to adequately report SRS transmission timing and SRS parameters to a mobile terminal apparatus, and efficiently use radio resources to be used for SRS transmission.

Solution to Problem

One mode of a radio base station apparatus according to the present invention is a radio base station apparatus to report SRS (Sounding Reference Signal) transmission control information to a mobile terminal apparatus and controls transmission of an SRS by the mobile terminal apparatus, and this radio base station apparatus has: an SRS setting section that selects bit information to report to the mobile terminal apparatus, from a table having bit information to indicate not to trigger the SRS and bit information to indicate to trigger the SRS using a default SRS parameter; and a reporting section that reports the bit information for the mobile terminal apparatus using a downlink control channel.

According to this configuration, it is possible to set SRS transmission control information in a flexible fashion and report this SRS transmission control information to a mobile terminal apparatus, and, furthermore, use radio resources used for SRS transmission efficiently.

One mode of a mobile terminal apparatus according to the present invention is a mobile terminal apparatus to transmit an SRS based on SRS transmission control information reported from a radio base station apparatus, and this mobile terminal apparatus has: a receiving section that receives bit information to indicate not to trigger the SRS and bit information to indicate to trigger the SRS using a default SRS parameter; a downlink control channel receiving section that specifies SRS transmission content based on the bit information; and an SRS transmission setting section that controls SRS transmission based on the specified SRS transmission content.

One mode of a radio communication method according to the present invention is a radio communication method to report SRS transmission control information from a radio base station apparatus to a mobile terminal apparatus and control transmission of an SRS by the mobile terminal apparatus, and this radio communication method includes, at the radio base station apparatus, the steps of: selecting bit information to report to the mobile terminal apparatus, from a table having bit information to indicate not to trigger the SRS and bit information to indicate to trigger the SRS using a default SRS parameter; and reporting the predetermined bit information for the mobile terminal apparatus using a downlink control channel.

Technical Advantage of the Invention

According to the present invention, when an aperiodic SRS is adopted, it is possible to adequately report SRS transmission timing and SRS parameters to a mobile terminal apparatus, and efficiently use radio resources to be used for SRS transmission.

BRIEF DESCRIPTION OF DRAWINGS

FIGS. 3A and 3B are diagrams for explaining an aperiodic SRS transmission method to be used when only one-bit information as to whether or not there is an SRS trigger is included in a UL scheduling grant;

FIGS. 4A-4F provide diagrams showing examples of mapping tables in which whether or not there is an SRS trigger and part of information related to SRS parameters are subject to joint coding, in SRS transmission control according to an embodiment of the present invention;

FIGS. 13A-13B provide diagrams showing examples of mapping tables to apply to different DCI formats In SRS transmission control according to an embodiment of the present invention;

FIGS. 14A-14B provide diagrams showing examples of mapping tables of varying numbers of bits to apply to the same DCI format in SRS transmission control according to an embodiment of the present invention.

DESCRIPTION OF EMBODIMENTS

Embodiment 1

Figure 1:
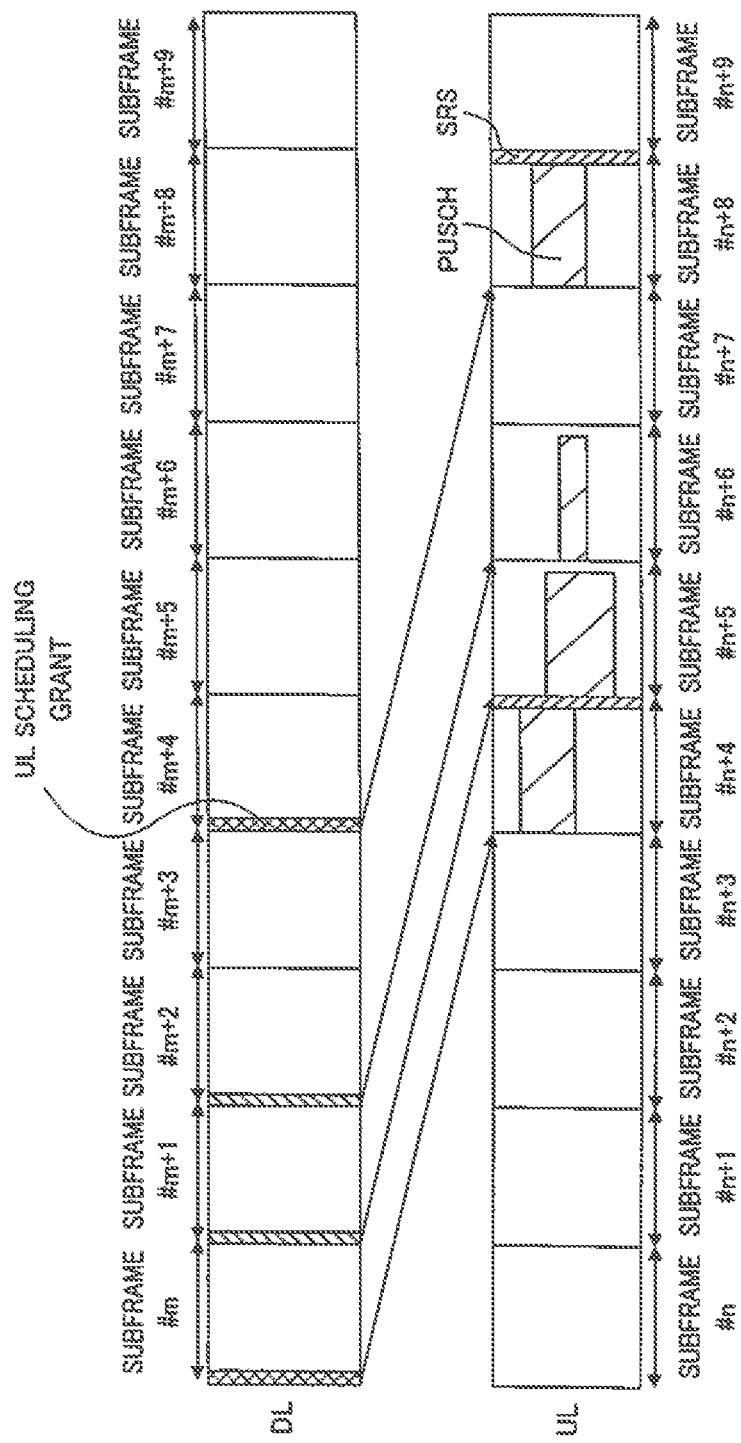
FIG. 1 is a diagram for explaining an aperiodic SRS transmission method.

An aperiodic SRS will be described with reference to FIG. 1. FIG. 1 shows a case where, in a radio base station apparatus, the UL scheduling grants of sub frames #m and #m>4 are selected as UL scheduling grants to include an SRS transmission command (that is to say, an identification bit to indicate that SRS transmission is "on"). When a mobile terminal apparatus receives the UL scheduling grants including an SRS transmission command, in response to these, the mobile terminal apparatus is able to transmit the SRSs to the radio base station apparatus, for example, with the PUSCH signals to transmit in subframes #n+4 and #n+8, which are four subframes later.

In this case, the SRSs are transmitted in the same subframes as the PUSCH signals commanded to be transmitted by the UL scheduling grants to include a transmission command, and therefore are multiplexed on the last symbols of subframes #n+4 and #n+8. That is to say, the SRSs are multiplexed to continue after the PUSCHs allocated to subframes #n+4 and #n+8. The radio base station apparatus measures channel quality based on the SRSs multiplexed in this way to continue from the PUSCHs, and performs scheduling for the PUSCH signal transmission in the mobile terminal apparatus. Consequently, it is possible to measure channel quality at the actual timing a PUSCH signal is transmitted, and therefore it is possible to perform scheduling taking into account the actual channel state.

In this way, by controlling SRS transmission in arbitrary timing, it is possible to set the radio resources to be used for SRS transmission in a flexible fashion. However, on the other hand, when aperiodic SRS transmission is performed, as described above, it is necessary to adequately transmit information to control SRS transmission timing (whether or not there is an SRS trigger) and SRS transmission control information such as SRS parameters (comb, frequency position, cyclic shift number, bandwidth and so on) to control the specific transmission conditions when the SRS is transmitted, and so on, to the mobile terminal apparatus.

For example, as described above, when whether or not there is an SRS trigger is controlled by including SRS transmission command information in a UL scheduling grant, that is, by using a downlink control channel, a signaling method as to, for example, how to control and perform reporting of other information such as SRS parameters to define the SRS transmission conditions is not specifically determined and will be subject to discussion from now. So, the present inventor has studied an appropriate method of reporting SRS transmission control information to a mobile terminal apparatus and arrived at the present invention.

First, as a method of reporting SRS transmission control information, the present inventor has studied a case of including and reporting information (one-bit information) concerning whether or not there is an SRS trigger, in a UL scheduling grant, to a mobile terminal apparatus, and reporting other information such as SRS parameters (hereinafter simply referred to as "SRS parameters") to define specific transmission conditions by RRC signaling.

Figure 2:
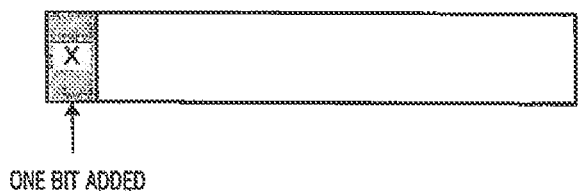
FIG. 2 is a diagram showing a mapping table to be used when only one-bit information as to whether or not there is an SRS trigger is included in a UL scheduling grant.

In the course of studying the above, the present inventor has found out that there is a threat of not being able to utilize radio resources in an sufficiently efficient fashion when only one-bit information as to whether or not there is an SRS trigger (aperiodic SRS trigger/no aperiodic SRS trigger) is included and reported in a UL scheduling grant, to a mobile terminal apparatus (see FIG. 2).

In the case of FIG. 2, resources for the aperiodic SRS sent by each mobile terminal apparatus are determined in advance in an upper layer, so that, when resources are set up not to collide between different mobile terminal apparatuses, resources are secured even for mobile terminal apparatuses that do not perform SRS transmission (see FIG. 3A). As a result of this, it is not possible to utilize radio resources in SRS transmission.

On the other hand, when, in order to effectively utilize radio resources in SRS transmission, resources to be allocated that are determined in an upper layer are set up to be shared between a plurality of mobile terminal apparatuses, cases might occur where the SRS transmission timing collides between different mobile terminal apparatuses. In this case, problems might occur where the SRS cannot be transmitted at arbitrary timing and where SRS transmission is significantly delayed (see FIG. 3B).

Also, as a method of reporting SRS transmission control information, a method of including information as to whether or not there is a trigger and all SRS transmission control information such as SRS parameters and so on, in a downlink control channel, and reporting these information to a mobile terminal apparatus is possible. However, in this case, a problem might occur where downlink control channel signaling overhead increases significantly.

Then, the present inventor has found out providing a bit field of two bits or more in a downlink control channel (for example, a UL scheduling grant or a DL scheduling grant), combining whether or not there is an SRS trigger with part of information related to SRS parameters and defining these as bit information (joint coding), reporting this bit information to a mobile terminal apparatus, and reporting the rest of the SRS parameter information by an upper layer. By this means, it is possible to set up whether or not there is an SRS trigger and SRS transmission control information such as SRS parameters in a flexible fashion and report these to a mobile terminal apparatus adequately. Also, by reporting part of information related to SRS parameters using a downlink control channel, it is possible to control part of aperiodic SRS resources transmitted by each mobile terminal apparatus in a lower layer, and consequently it is possible to effectively utilize the radio resources.

Also, the present inventor has found out selecting information related to SRS parameters to be defined as bit information by combining with whether or not to provide an SRS trigger and the number of bits based on the communication conditions of a mobile terminal apparatus (including, for example, the number of antennas of the mobile terminal apparatus, the position of the mobile terminal, apparatus in the cell (i.e. the distance with respect to a radio base station apparatus), the number of mobile terminal apparatuses in the cell, and so on). By this means, depending on the communication conditions of a mobile terminal apparatus, it is possible to set up SRS transmission control information in a flexible fashion and report SRS transmission control information to the mobile terminal apparatus adequately.

Hereinafter, aperiodic SRS transmission control where SRS transmission by a mobile terminal apparatus is controlled by reporting SRS transmission control information from a radio base station apparatus to a mobile terminal apparatus performing radio communication will be described. Note that, although, with the present embodiment, an example of application to LTE-A will be described, the present invention is by no means limited to the case of applying to LTE-A.

In the aperiodic SRS transmission control according to the present embodiment, a radio base station apparatus reports bit information defined by combining whether or not there is an SRS trigger (aperiodic SRS trigger/no aperiodic SRS trigger) and part of information related to SRS parameters, to a mobile terminal apparatus, using a downlink control channel and controls the aperiodic SRS transmission of the mobile terminal apparatus. Rote that part of the information related to SRS parameters include conditions required for SRS transmission such as comb, frequency position, cyclic shift number, bandwidth and so on (part of SRS parameters themselves), information related to the difference values from the default SRS parameters that are set in advance, information as to which of a plurality of default SRS parameters that are set up in advance is selected (selection in formation) and suchlike information that relates to SRS parameters.

To be more specific, a radio base station apparatus sets an SRS trigger format that is defined as bit information by combining whether or not there is an SRS trigger and part of information related to SRS parameters, and selects predetermined bit information to apply to the SRS transmission control by a mob lie terminal apparatus from the SRS trigger format. Then, the predetermined bit information that is selected is reported to the mobile terminal apparatus using a downlink control channel, dote that the SRS trigger format that is set up is reported to mobile terminal apparatus in advance using RRC signaling and so on.

Also, a mobile terminal apparatus receives the SRS trigger format reported from the radio base station apparatus by RRC signaling and so on. Also, predetermined bit information included in a downlink control channel is received.

Then, the mobile terminal apparatus specifies the content of SRS transmission (whether or not there is an SRS trigger, SRS transmission conditions, and so on) based on the SRS trigger format and predetermined bit information that are received and so on, and performs SRS transmission control. Note that the information that is not included in the downlink control channel in the SRS transmission control information (information related to SRS parameters that is not defined in the SRS trigger format, and so on) can be configured to be separately reported to the mobile terminal apparatus by RRC signaling and so on.

The radio base station apparatus can be configured to select a specific mapping table from a plurality of SRS trigger formats (also referred to as "mapping tables") in which varying types of SRS parameters are defined. A plurality of mapping tables are set up depending on the types of SRS parameters, and the radio base station apparatus selects a specific mapping table to apply to the mobile terminal apparatus by RRC signaling and so on.

Alternately, the radio base station apparatus may as well adopt, as a method of setting up the SRS trigger format, a technique of reporting the default SRS parameters to the mobile terminal apparatus by RRC signaling and so on, and defining the differences from the default SRS parameters by combining with whether or not there is an SRS trigger, and reporting using a downlink control channel. In this case, it is possible to a provide a configuration In which mapping tables are described as differences from the default SRS parameters and the details of the differences can be changed in a flexible fashion by RRC signaling.

Alternately, as a method of setting up the SRS trigger format, a technique may be adopted, whereby the radio base station apparatus reports a plurality of default SRS parameters to the mobile terminal apparatus by RRC signaling and so on, defines which of the default SRS parameters is used (default SRS parameter selection information), by combining with whether or not there is an SRS trigger (aperiodic SRS trigger/no aperiodic SRS trigger), and reports using a downlink control channel. Specific examples of mapping tables will be described below with reference to FIG. 4 and FIG. 5.

FIG. 4 shows a case where an SRS trigger format (mapping table) is defined by two bits of bit information. FIG. 4A to FIG. 4C are three mapping tables in which different types of SRS parameters are defined as a plurality of mapping tables. FIG. 4A shows a case of using "comb" as an SRS parameter to report in the PDCCH, FIG. 4B shows a case of using "frequency position" as an SRS parameter to report in the PDCCH, and FIG. 4C shows a case of using "cyclic shift number (CS)" as an SRS parameter to report in the PDCCH.

Also, FIG. 4D and FIG. 4E show cases of using differences from the default SRS parameters as content to report In the PDCCH, and FIG. 4F shows a case of using "selection from a plurality of default SRS parameters" as content to report in the PDCCH. Now, each mapping table will be described below in detail.

The mapping table shown in FIG. 4A at least includes bit information not to transmit the SRS and bit information to define the comb to transmit the SRS. To be more specific, bit information "00" indicates that the SRS is not transmitted (the SRS is not triggered), bit information "01" indicates that the SRS is transmitted in comb 0 (SRS is triggered), bit information "10" indicates that the SRS is transmitted in comb 1 (SRS is triggered), and bit information "11" indicates that nothing is set, or that reservation is made for future enhancement. Note that comb is the parameter to define the subcarrier position to transmit the SRS, and employs two types of states.

Also, with the present embodiment, information as to whether or not there is an SRS trigger and information related to SRS parameters (here, comb) are not defined separately, but are combined and defined as bit information (joint coding). In this way, information as to whether or not there is an SRS trigger and information related to SRS parameters are subject to joint coding, thereby snaking it possible to suppress the increase of the number of PDCCH bits and utilize radio resources effectively.

The mapping table shown in FIG. 4B at least includes bit information not to transmit the SRS and bit information to define the frequency position to transmit the SRS. To be more specific, bit information "00" indicates that the SRS is not transmitted, bit information "01" indicates that the SRS is transmitted in frequency position 0, bit information "10" indicates that the SRS is transmitted in frequency position 1, and bit information "11" indicates that the SRS is transmitted in frequency position 2. Mote that the frequency position is the parameter to define the position of the frequency to transmit the SRS, and the number of frequency positions is set based on the system bandwidth and the SRS bandwidth per user.

Also, in FIG. 4B, similar to FIG. 4A, information as to whether or not the SRS is transmitted and information related to SRS parameters (here, the frequency position) are subject to joint coding, and the increase of the number of PDCCH bits is suppressed.

The mapping table shown in FIG. 4C at least includes bit information not to transmit the SRS and bit information to define the cyclic shift number to apply upon transmitting the SRS. To be more specific, bit information "00" indicates that the SRS is not transmitted, bit information "01" indicates that the SRS is transmitted by CS 0, bit information "10" indicates that the SRS is transmitted by CS 1, and bit information "11" indicates that the SRS is transmitted by CS 2. Note that the cyclic shift number is the parameter to define the amount of cyclic shift upon performing orthogonal multiplexing using cyclic shift, and employs eight patterns of states. The cyclic shift numbers in the mapping table may be, for example, defined in an continuous arrangement (for example, CS 0, CS 1, CS 1) as in the example of FIG. 4C, or may be mapped discretely (for example, CS 0, CS 3 and CS 6).

Also, in FIG. 4C, FIGS. 4A and 4B, information as to whether or not the SRS is transmitted, and information related to SRS parameters (here, the cyclic shift number) are subject to joint coding, the increase in the number of PDCCH bits is suppressed.

The mapping table shown in FIG. 4D at least includes bit information not to transmit the SRS, bit information to command transmission by the default SRS parameters that are separately reported by RRC signaling, bit information to define the amount of cyclic shift, which reports the cyclic shift difference from the default parameter. To be more specific, bit information "00" indicates that the SRS is not transmitted, bit information "01" indicates that the SRS is transmitted by the default SRS parameters, bit information "10" indicates that the SRS is transmitted by shifting the amount of cyclic shift from the default SRS parameters by the value of x, and bit information "11" indicates that the SRS is transmitted by shifting the amount of cyclic shift from the default SRS parameters by the value of y. Here, the x value and the y value for the amount of cyclic shift may be determined in advance or may be changed in a flexible fashion by RRC signaling.

The mapping table shown in FIG. 4E at least includes bit information not to transmit the SRS, bit information to command transmission by the default SRS parameters that are separately reported by RRC signaling, and bit information to define the amount of cyclic shift which reports the difference of comb from the default parameter, or the cyclic shift difference. To be more specific, bit information "00" indicates that the SRS is not transmitted, bit information "01" indicates that the SRS is transmitted by the default SRS parameters, bit information "10" indicates that the SRS is transmitted by a different comb from the default SRS parameter, and bit information "11" indicates that the SRS is transmitted by shifting the amount of cyclic shift from the default SRS parameters by the value of x. Here, the x value for the amount of cyclic shift may be determined in advance or may be changed in a flexible fashion by RRC signaling.

The mapping table shown in FIG. 4F at least includes bit information not to transmit the SRS, and bit information to command transmission using one of a plurality of default SRS parameters reported separately by RRC signaling. To be more specific, bit information "00" indicates that the SRS is not transmitted, bit information "01" indicates that the SRS is transmitted by a default a SRS parameter, bit information "10" indicates that the SRS is transmitted by a default b SRS parameter, and bit information "11" indicates that the SRS is transmitted by a default c SRS parameter.

Also, with the present embodiment, as a method of selecting the SRS parameters to define in the SRS trigger format and the number of bits, it is possible to provide a configuration to make selection based on the communication conditions of the mobile terminal apparatus (including, for example, the number of antennas of the mobile terminal apparatus, the position of the mobile terminal apparatus in the ceil (i.e. the distance with respect to a radio bass station apparatus), the number of mobile terminal apparatuses in the cell, and so on).

For example, when a radio base station apparatus selects an arbitrary mapping table from a plurality of mapping tables in which varying types of SRS parameters are defined as shown in above FIG. 4A to FIG. 4C, the radio base station apparatus is able to select the mapping table based on the relationship between the SRS parameters set in each mapping table and the communication conditions of the mobile terminal apparatus.

To be more specific, it is preferable to preferentially select a mapping table in which SRS parameters, whereby the setup range of SRS parameters is less likely to be influenced by the communication conditions of the mobile terminal apparatus.

For example, when the mobile terminal apparatus uses a plurality of antennas, it is preferable to select mapping tables (FIG. 4A and FIG. 4B) defining other SRS parameters from the parameter (for example, the cyclic shift number) to use for antenna multiplexing. This is because, when the cyclic shift number is used for an SRS trigger format while the cyclic shift number is also used for antenna multiplexing, there is a threat that, due to the overlapping use for both antenna multiplexing and user multiplexing, the freedom of SRS transmission control information may be reduced.

Also, for a mobile terminal apparatus (for example, a mobile terminal apparatus near the cell) that transmits the SRS over a wideband, it is preferable to select mapping tables (FIG. 4A and FIG. 4C) defining SRS parameters other than the SRS parameters related to frequency (frequency position, bandwidth and so on). This is because the advantage of multiplexing between users by frequency positions is not achieved with respect to a mobile terminal apparatus that transmits the SRS over a wideband.

Also, when there are a large number of mobile terminal apparatuses in the cell, it is preferable to define information such as SRS parameters in the mapping table in detail. Consequently, in this case, it is preferable to select a mapping table in which the number of bits is large.

Figures 5A, 5B, 5C:
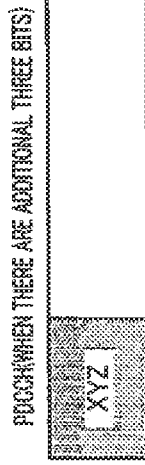
FIGS. 5A-5C provide diagrams showing examples of mapping tables in which whether or not there is an SRS trigger and part of information related to SRS parameters are subject to joint coding, in SRS transmission control according to an embodiment of the present invention.

FIG. 5 shows a case where the SRS trigger format (mapping table) is defined by three bits of bit information. Here, a case is shown where, as a plurality of mapping tables, two different types of SRS parameters (at least two of comb, the frequency position or the cyclic shift number) are defined. To be more specific, FIG. 5A shows a case of using comb and the frequency position, FIG. 5B shows a case of using comb and the cyclic shift number, and FIG. 5C shows a case of using the frequency position and the cyclic shift number. Now, each mapping table will be described below in detail.

The mapping table shown in FIG. 5A at least includes bit information not to transmit the SRS, and bit information defined by combining comb and the frequency position to transmit the SRS. To be more specific, bit information "000" indicates that the SRS is not transmitted, bit information "001" indicates that the SRS is transmitted in comb 0 and frequency position 0, bit information "010" indicates that the SRS is transmitted in comb 0 and frequency position 1, bit information "011" indicates that the SRS is transmitted in comb 0 and frequency position 2, bit information "100" indicates that the SRS is transmitted in comb 1 and frequency position 0, bit information "101" indicates that the SRS is transmitted in comb 1 and frequency position 1, bit information "110" indicates that the SRS is transmitted in comb 1 and frequency position 2, and bit information "111" indicates that nothing is set or that reservation is made for future enhancement.

That is, information as to whether or not there is an SRS trigger and information related to SRS parameters (here, comb and the frequency position) are not defined separately but are combined and defined as bit information (joint coding). In this way, by performing joint coding of information as to whether or not there is an SRS trigger and information related to a plurality of SRS parameters, it is possible to effectively suppress the increase of the number of PDCCH bits.

The mapping table shown in FIG. 5B at least includes bit information not to transmit the SRS, and bit information defined by combining comb and the cyclic shift number to transmit the SRS. To be more specific, bit information "000" indicates that the SRS is not transmitted, bit information "001," "010" and "011" indicate that the SRS is transmitted in comb 0 and by CS 0 to CS 2, respectively, bit information "100," "101" and "110" indicate that the SRS is transmitted in comb 1 and by CS 0 to CS 2, respectively, bit information "111" indicates that nothing is set or that reservation is made for future enhancement.

The mapping table shown in FIG. 5C at least includes bit information not to transmit the SRS, and bit information defined by combining the frequency position and cyclic shift number to transmit the SRS. To be more specific, bit information "000" indicates that the SRS is not transmitted, bit information "001," "010" and "011" indicate that the SRS is transmitted in frequency position 0 and by CS 0 to CS 2, respectively, bit information "100," "101" and "110" indicate that the SRS is transmitted in frequency position 1 and by CS 0 to CS 2, respectively, and bit information "111" indicates that nothing is set or that reservation is made for future enhancement.

When above FIG. 5A to FIG. 5C are defined as a plurality of mapping tables, the radio base station apparatus selects an arbitrary mapping table per mobile terminal apparatus and reports this to the mobile terminal apparatus as an SRS trigger format.

Also, when the radio base station apparatus selects an arbitrary mapping table from a plurality of mapping tables in which different types of SRS parameters are defined as shown in above FIG. 5A to FIG. 5C, as described above, the radio base station apparatus is able to make selection based on the communication conditions of the mobile terminal apparatus.

Although a case has been shown with above FIG. 5 where, as a plurality of mapping tables, two different types of SRS parameters (at least two of comb, the frequency position or the cyclic shift number) are defined, it is also possible to define by one type of SRS parameters or define by three or more types of SRS parameters as in the configurations of FIG. 4A to FIG. 4C. Alternately, a configuration that is premised on reporting the default parameters by RRC signaling as in the configurations of FIG. 4D to FIG. 4F, may be provided.

Note that a plurality of mapping tables may be configured to be stored in a storage section of a radio base station apparatus and selected from the storage section, or may be configured to be selected from mapping tables stored in other radio communication apparatuses. Also, the mapping tables shown in FIG. 4, FIG. 5 are only examples, and information related to SRS parameters to be set in the mapping tables or their combinations are by no means limited to these. Also, the number of bits to be set is not limited either, as long as it is equal to or greater than two.

Next, the application of the above-described SRS trigger format to a downlink control channel (PDCCH) will be described below in detail. In the PDCCH, a plurality of different DCI (Downlink Control Information) formats are defined, depending on the transmission mode, transmission information and so on. For example, DCI format 0 is used to report scheduling information of an uplink shared channel (PUSCH) (UL scheduling grant).

With the present embodiment, predetermined bit information in the SRS trigger format is included in one DCI format which defines information related to the SRS, among a plurality of DCI formats, and is reported to the mobile terminal apparatus. Also, the information related to the SRS can be defined in a plurality of DCI formats, and, for example, at least information related to the SRS is defined in the first DCI format and second DCI format. Note that the number of DCI formats to define information related to the SRS is not limited to two.

When information related to the SRS is defined in a plurality of DCI formats, cases might occur where the number of bits to allocate and SRS transmission content differ between SRS trigger formats corresponding to individual DCI formats. For example, in DCI format 0, allocating one bit with respect to the SRS is studied. Also, there is ongoing discussion to define DCI format 4 as a UL scheduling grant for UL multi-antenna transmission, and, in DCI format 4, two bits or more (two bits or three bits are studied to be allocated.

In this case, as information related to SRS parameters, one pattern can be defined in DCI format 0, and three patterns (in the event of two bits) or seven patterns (in the event of three bits) can be defined in DCI format 4. That is, content that can be defined varies between DCI format 0 and DCI format 4.

For example, for DCI format 0, as shown in FIG. 13A, an SRS trigger format having bit information "0" not to transmit the SRS, and bit information "1" to command to transmit default x SRS parameters, which are reported separately by RRC signaling, is used. Also, for DCI format 4, as shown in FIG. 13B, an SRS trigger format to include bit information "00" not to transmit the SRS, and bit information "01," "10" and "11" to command to transmit one of a plurality of default a, b and c SRS parameters, is used. Note that the plurality of default a, b and c SRS parameters are reported separately by RRC signaling, In this way, when an SRS trigger format is set for each DCI format in which information related to the SRS is defined, it is possible to provide a configuration in which, by defining different transmission content per DCI format (X is different from all of a, b, and c), it is possible to provide different SRS resources per DCI format within one user, and, on the other hand, it is necessary to configure individual SRS resource allocation per DCI format, and therefore the SRS resource design becomes complex, Consequently, when a plurality of DCI formats to define information related to the SRS are defined, it is preferable to set common SRS transmission content between the SRS trigger formats corresponding to individual DCI formats, from the perspective of reducing RRC signaling overhead. For example, in FIG. 13, X may be set to be the same as one of a, b and c.

In this way, by setting the transmission content of SRS trigger formats corresponding to different DCI formats in common, it is possible to reduce RRC signaling overhead.

When the number of bits to allocate differs between a plurality of DCI formats in which information related to the SRS is defined, as shown in FIG. 13, it is possible to define the transmission content to be defined in the SRS trigger format of the smaller number of bits to be included in the transmission content defined in the SRS trigger format of the larger number of bits.

Note that although FIG. 13 has been described with reference to examples of DC format 0 and DCI format 4 to be UL scheduling grants, as DCI formats in which information related to the SRS is defined, it is equally possible to provide a configuration in which information related to the SRS is defined in other DCI formats. For example, it is also possible to define information related to the SRS in a DCI format (for example, DCI format 1A and so on) to be a DL scheduling grant. In this case, when information related to the SRS is defined in the DCI formats of a plurality of DL scheduling grants, it is preferable to set common SRS transmission content in the SRS trigger formats corresponding to individual DCI formats.

Also, given predetermined DCI formats in which information related to the SRS is defined, it is possible to provide a configuration to set a plurality of SRS trigger formats of varying numbers of bits and adequately select the SRS trigger format to apply, based on predetermined conditions.

For example, in DCI format 4, it is preferable to set the SRS transmission content to define in the SRS trigger format taking into account the number of bits to set (two bits or three bits). To be more specific, in an SRS trigger format corresponding to a relatively small number of bits (for example, two bits), content to report SRS default parameters is adopted (see FIG. 14A). By this means, it is possible to improve the freedom of resources which the network side can designate.

On the other hand, in an SRS trigger format corresponding to a relatively large number of bits (for example, three bits), content to shift part of the SRS default parameters is adopted (see FIG. 14B). By this means, it is possible to reduce RRC signaling overhead.

Also, when, as shown in FIG. 14, the transmission content of the SRS trigger format is set to correspond to different numbers of bits, it is possible to provide a configuration to perform control adequately depending on the situation by adequately performing reporting with respect to the number of bits to select, using RRC signaling. For example, when the number of users is small, an SRS trigger format that is defined by a relatively small number of bits (for example, two bits) is applied, and two-bit information is reported by the PDSCH. Also, when the number of users is equal to or greater than a predetermined number, it is possible to configure to apply an SRS trigger format that is defined by a relatively large number of bits (for example, three bits), and report three-bit information by the PDSCH.

In this way, by setting SRS transmission content in the SRS trigger format according to the number of bits and selecting the number of bits to report based on predetermined conditions, it is possible to set SRS transmission control information in a flexible fashion and use radio resources efficiently.

Figure 6:
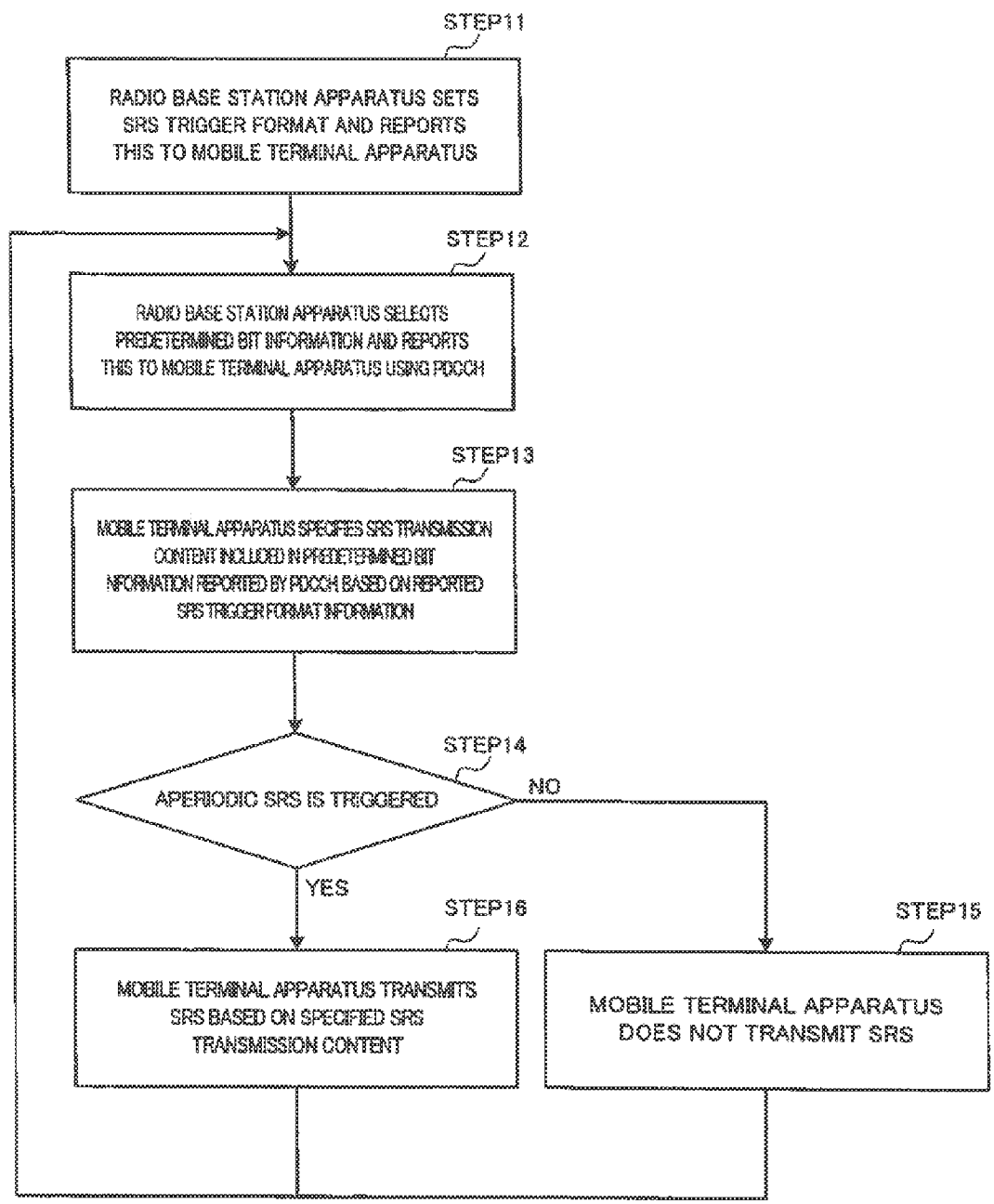
FIG. 6 is a diagram for explaining the steps of SRS transmission control according to an embodiment of the present invention.

Now, detailed steps of aperiodic SRS transmission control will be described below with reference to FIG. 6.

First, a radio base station apparatus sets an SRS trigger format in which whether or not there is an SRS trigger and part of information related to SRS parameters is combined and defined as bit information, and reports this SRS trigger format to a mobile terminal apparatus (step 11). For example, the radio base station apparatus selects a predetermined mapping table for the mobile terminal apparatus from a plurality of mapping tables in which different types of SRS parameters are defined as shown in FIG. 4 and FIG. 5 above, and reports the table to the mobile terminal apparatus as an SRS trigger format. Reporting to the mobile terminal apparatus can be made using RRC signaling. Also, as shown in FIG. 4D to FIG. 4F, when a technique to require default SRS parameters is used, in addition, the default SRS parameters are reported together.

Note that when a radio base station apparatus selects an arbitrary mapping table from a plurality of mapping tables, as described above, the radio base station apparatus is able to make the selection based on the communication conditions of the mobile terminal apparatus.

Next, the radio base station apparatus selects predetermined bit information to apply to the mobile terminal apparatus from the SRS trigger format (mapping table) that is set, and reports this bit information to the mobile terminal apparatus using a downlink control channel (step 12). Reporting to the mobile terminal apparatus can be included in a UL scheduling grant or a DL scheduling grant.

Next, the mobile terminal apparatus receives the SRS trigger format reported from the radio base station apparatus and the predetermined bit information reported using a downlink control channel, and, based on these information, specifies the SRS transmission content (step 13). Note that other SRS transmission control information that is not allocated to a downlink control channel is reported separately to the mobile terminal apparatus by RRC signaling and so on.

Next, the mobile terminal apparatus controls SRS transmission based on the specified SRS transmission content (step 14). When the specified SRS transmission content is information not to transmit the SRS (that does not trigger the SRS), the SRS is not transmitted (step 15). On the other hand, when the specified SRS transmission content includes information to trigger the SRS, she SRS is transmitted based on the transmission conditions defined by the SRS parameters reported to the mobile terminal apparatus (step 16). To be more specific, the SRS is transmitted by predetermined conditions, using the specified SRS transmission content and other SRS transmission control information reported by RRC signaling.

Embodiment 2

With the present embodiment, SRS transmission control in the event a periodic SRS for periodic transmission to a mobile terminal apparatus and an aperiodic SRS are combined and applied, will be described.

Figure 15:
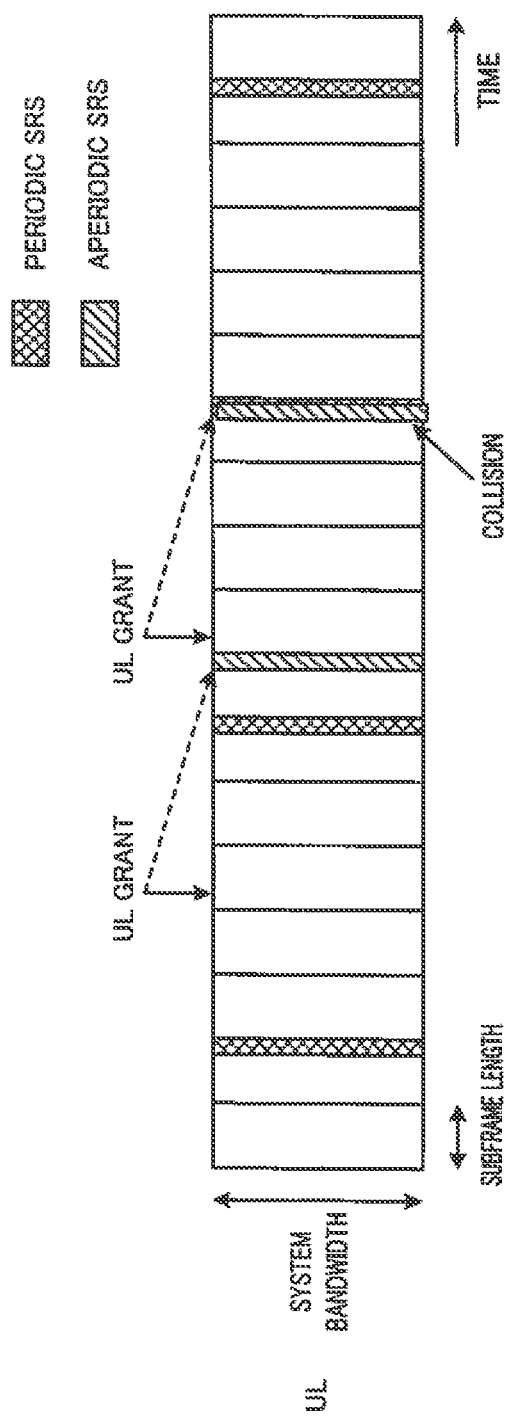
FIG. 15 is a diagram for explaining a transmission method combining an aperiodic SRS and a periodic SRS.

When aperiodic SRS and an aperiodic SRS are combined and applied, the periodic SRS is transmitted at predetermined transmission intervals, while the aperiodic SRS is transmitted based on SRS transmission control information reported from the radio base station apparatus. For example, as shown in FIG. 15, the periodic SRS is multiplexed on the last symbol of each sub-frame based on a transmission period of 5 msec. On the other hand, the aperiodic SRS is transmitted with the PUSCH signal to be transmitted in the subframe four subframes after a UL scheduling grant including an aperiodic SRS transmission command is reported.

In this case, cases might occur where, depending on the timing the UL scheduling grant is reported, the transmission timings of the periodic SRS and the aperiodic SRS overlap. As a result, there is a threat that SRS transmission is significantly delayed.

Consequently, when a periodic SRS and an aperiodic SRS are combined and applied and the transmission timings of the periodic SRS and the aperiodic SRS overlap, in the subframe where transmission timings overlap, ether one of the SRSs is transmitted preferentially, and the other SRS is not transmitted. By this means, even when a periodic SRS and an aperiodic SRS are combined and applied, it is possible to suppress the SRS transmission delay that is caused due to overlap of transmission timing between the periodic SRS and the aperiodic SRS.

As an example, it is possible to provide a configuration to prioritize the aperiodic SRS, by which channel quality can be measured at the timing a PUSCH signal is transmitted. In this case, when the transmission timings of the periodic SRS and the aperiodic SRS overlap, the periodic SRS is not transmitted and the aperiodic SRS is transmitted preferentially. Note that It is also possible to prioritize the periodic SRS depending on the communication environment, and the SRS to be prioritized can be reported by RRC signaling.

Also, as another method, it is also possible to provide a configuration to avoid the collision of transmission timing between periodic SRS and aperiodic SRS by setting the transmission timings of periodic SRS and aperiodic SRS to be spread over different subframes.

In this case, in a given subframe, the periodic SRS alone is set, and the aperiodic SRS is set in a separate subframe. For example, the periodic SRS having a transmission period of 5 msec is set only in 5×n subframes (n is an integer equal to or greater than 1), and the aperiodic SRS is set in one of subframes other than 5×n.

Note that, with the present embodiment, for the aperiodic SRS transmission control, it is possible to apply the configuration shown in above embodiment 1. In this case, the mobile terminal apparatus transmits the aperiodic SRS to the radio base station based on SRS transmission control information reported from the radio base station apparatus, and also transmits the periodic SRS in a predetermined period.

Embodiment 3

Now, the configurations of the radio base station apparatus and the mobile terminal apparatus adopting the above-described reference signal transmission control will be described. Here, a case of using a radio base station apparatus and a mobile terminal apparatus supporting a system or the LTE-A scheme (LTE-A system) will be described.

Figure 7:
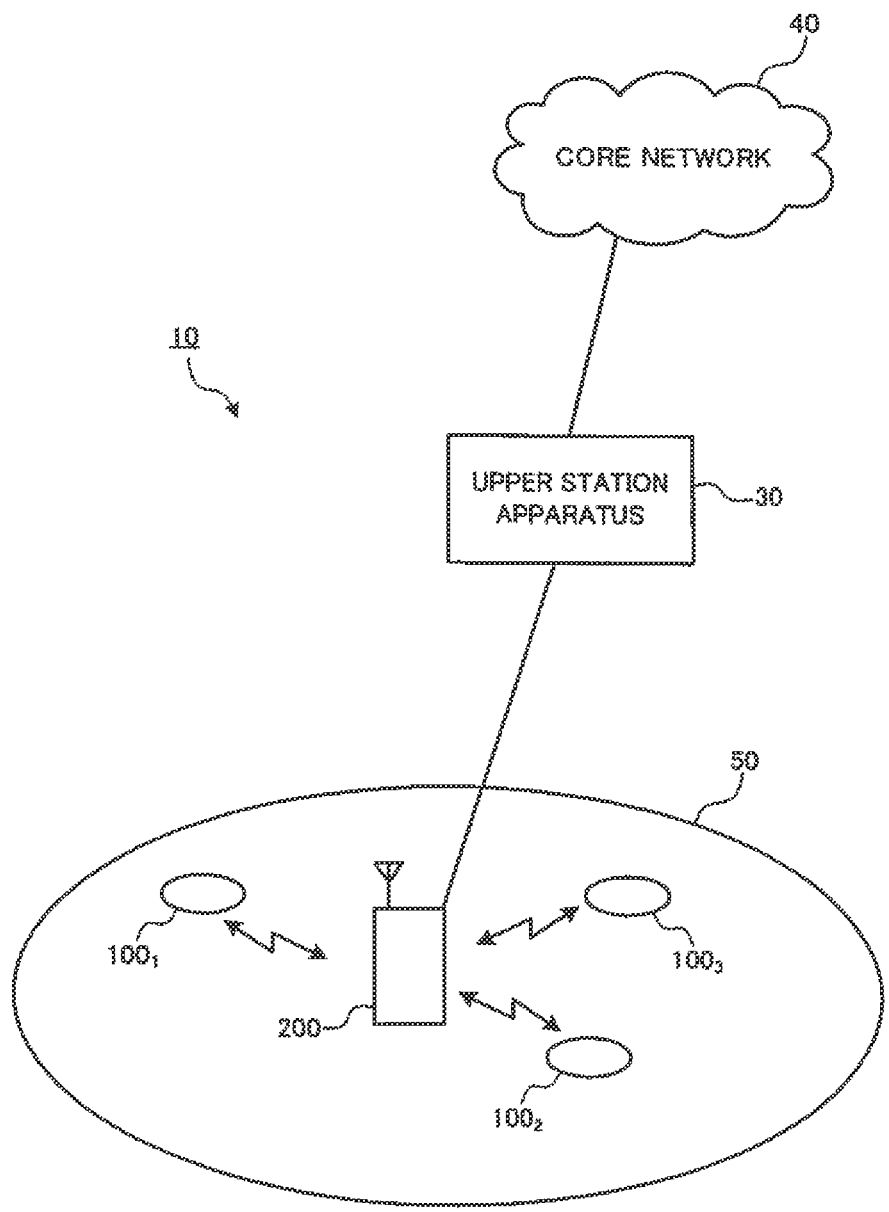
FIG. 7 is a diagram for explaining a configuration of a radio communication system according to an embodiment of the present invention.

First, with reference to FIG. 7, a radio communication system 10 having a mobile terminal apparatus 100 and a radio base station apparatus 200 will be described. FIG. 7 is a diagram for explaining the configuration of the radio communication system 10 having the mobile terminal apparatus 100 and the base station apparatus 200 according to the present embodiment. Note that the radio communication system 10 illustrated in FIG. 7 is a system to accommodate, for example, the LTE system or SUPER 3G. Also, this radio communication system 1 may be referred to as "IMT-Advanced" or may be referred to as "4G."

As illustrated in FIG. 7, the radio communication system 10 is configured to include the radio base station apparatus 200 and a plurality of mobile terminal apparatuses 100 ($100_1$, $100_2$, $100_3$, $100_n$, where n is an integer to satisfy n>0) that communicate with this radio base station apparatus 20. The radio base station apparatus 200 is connected with an upper station apparatus 30, and this upper station apparatus 30 is connected with a core network 40. The mobile terminal apparatuses 100 communicate with the radio base station apparatus 200 in a cell 50. Note that the upper station apparatus 30 includes, for example, an access gateway apparatus, a radio network controller (RNC), a mobility management entity (MME) and so on, but is by no means limited to these.

In the radio communication system 10, as radio access schemes, OFDMA (Orthogonal Frequency Division Multiple Access) is applied to the downlink, and SC-FDMA (Single-Carrier Frequency-Division Multiple Access) or clustered DFT-spread OFDM is applied to the uplink.

OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands. Clustered DFT-spread OFDM is a scheme to realize uplink multiple access by allocating groups (clusters) of discontinuous, clustered subcarriers to one mobile station UE and applying discrete Fourier transform, spread OFDM to each cluster.

Here, the communication channels in the LTE system will be described. As for the downlink, a PDSCH, which is used by each mobile terminal apparatus 100 on a shared basis, and downlink L1/L2 control channels (including the PDCCH, PCFICH and PHICH) are used. By means of this PDSCH, user data, that is, normal data signals, is transmitted. Transmission data is included in this user data. Note that the UL scheduling grant and the DL scheduling grant including the transmission identification bits are reported to the mobile terminal apparatus 100 by an L1/L2 control channel (PDCCH).

On the uplink, a PUSCH that is used by each mobile terminal apparatus 10 on a shared basis and a PUCCH, which is an uplink control channel, are used. User data is transmitted by means of this PUSCH. Furthermore, by means of this PUCCH, downlink radio quality information (CQI: Channel Quality Indicator) and so on are transmitted.

Figure 8:
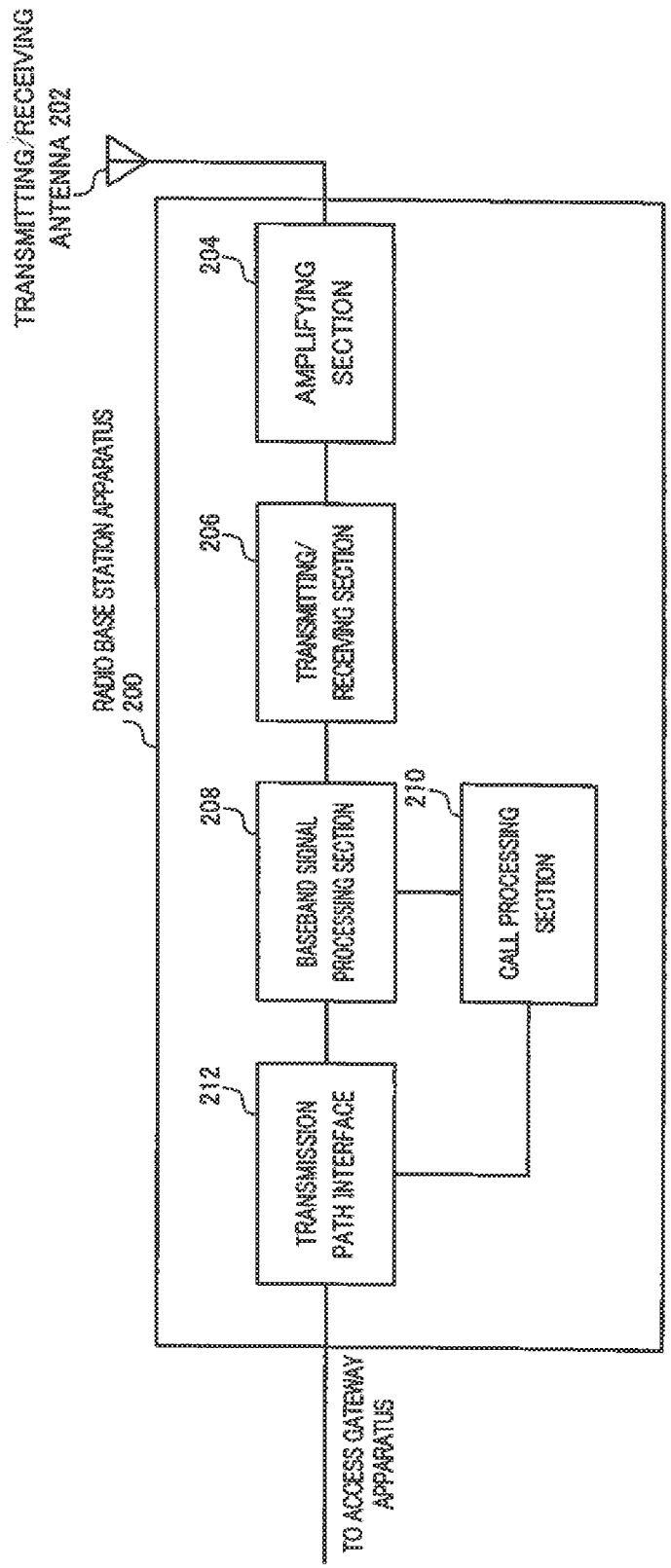
FIG. 8 is a block diagram showing an overall configuration of a radio base station apparatus according to an embodiment of the present invention.

Next, the functional configuration of the radio base station apparatus will be described with reference to FIG. 8. FIG. 8 is an example of a functional block diagram of a radio base station apparatus.

As shown in FIG. 8, the radio base station apparatus 200 is configured to include a transmitting/receiving antenna 202, an amplifying section 204, a transmitting/receiving section 206, a baseband signal processing section 208, a call processing section 210, and a transmission path interface 212. A plurality of transmitting/receiving antennas 202 may be provided.

Regarding uplink data, a radio frequency signal that is received in the transmitting/receiving antennas 202 is amplified in the amplifying section 204 such that the received power is corrected to certain power under AGC. The amplified radio frequency signal is subjected to frequency conversion into a baseband signal, in the transmitting/receiving section 206. This baseband signal is subjected to predetermined processes (error correction, decoding, and so on) in the baseband signal processing section 208, and transferred to an access gateway apparatus (not shown) via the transmission path interface 212. The access gateway apparatus is connected to the core network, and manages the mobile terminal apparatuses.

Downlink data is input in the baseband signal processing section 208, from a higher apparatus, via the transmission path interface 212. In the baseband signal processing section 208, the retransmission control (H-ARQ (Hybrid ARQ)) process, scheduling, transport format selection, channel coding and so on are performed, and the result is transferred to the transmitting/receiving section 206. The transmitting/receiving section 206 performs frequency conversion of the baseband signal output from the baseband signal processing section 208, into a radio frequency signal. The signal having been subjected to frequency conversion is later amplified in the amplifying section 204 and transmitted from the transmitting/receiving antennas 202.

The call processing section 210 transmits and receives a call process control signal to and from a radio control station of a higher apparatus, manages the state of the radio base station apparatus 200, and allocates resources. Note that the processes in the layer 1 processing section 2081 and MAC processing section 2082 are performed based on the state of communication between the radio base station apparatus 200 and the mobile terminal apparatus 100$_n$ set in the call processing section 210.

Figure 9:
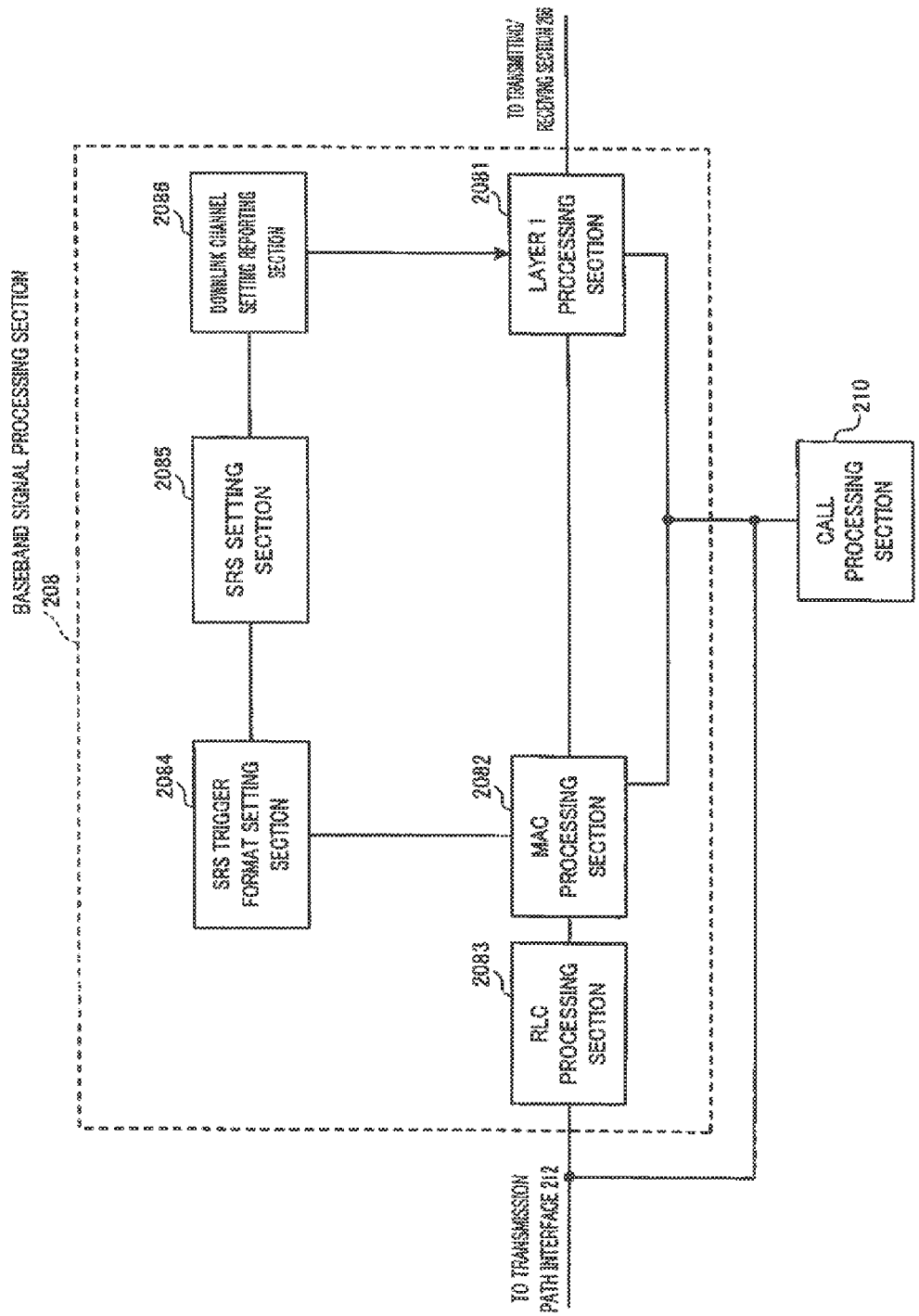
FIG. 9 is a diagram showing an example of a functional block diagram of a baseband signal processing section of a radio base station apparatus according to an embodiment of the present invention.

Next, the functional configuration of the baseband processing section will be described with reference to FIG. 9. FIG. 9 is a functional block diagram of a baseband processing section in the radio base station apparatus.

As shown in FIG. 9, the baseband signal processing section 208 has a layer 1 processing section 2081, a MAC (Medium Access Control) processing section 2082, an RLC processing section 2083, an SRS trigger format setting section 2084, an SRS setting section 2085, and a downlink channel setting reporting section 2086.

The layer 1 processing section 2081 mainly performs processes related to the physical layer. The layer 1 processing section 2081, for example, performs processes for a signal that is received on the uplink, including channel decoding, a discrete Fourier transform (DFT), frequency demapping, an inverse Fourier transform (IFFT), data demodulation and so on. Also, the layer 1 processing section 2081 performs processes for a signal to transmit on the downlink, including channel coding, data modulation, frequency mapping and an inverse Fourier transform (IFFT).

The MAC processing section 2082 performs processes for the signal received on the uplink, such as retransmission control in the MAC layer, scheduling for the uplink/downlink, transport format selection for the PUSCH/PDSCH, resource block selection for the PUSCH/PDSCH, and so on.

The RLC processing section 2083 performs, for a packet received on the uplink/a packet to transmit on the downlink, packet division, packet combining, retransmission control in the RLC layer, and so on.

The SRS trigger format setting section 2084 sets an SRS trigger format, in which whether or not there is an SRS trigger and part of information related to SRS parameters are combined and defined as bit information. The SRS trigger format that is set is reported to the mobile terminal apparatus by RRC signaling and so on. Also, the SRS trigger format setting section 2084 selects the information related to SRS parameters to set in the SRS trigger format based on the communication conditions of the mobile terminal apparatus.

Also, the SRS trigger format setting section 2084 is able set SRS trigger format by selecting a specific SRS trigger format from a plurality of SRS trigger formats (mapping table) in which different types of SRS parameters are defined, based on the communication conditions of the mobile terminal apparatus. In this case, it is possible to use the mapping tables shown in above FIG. 4 and FIG. 5. Note that a plurality of mapping tables may be configured to be stored inside the SRS trigger format setting section 2084, or may be configured to be stored in a storage section inside the radio base station apparatus and selected from the storage section. Also, it is also possible to configure to make selection from mapping tables stored in other radio communication apparatus.

The SRS setting section 2085 selects predetermined bit information to report to the mobile terminal apparatus from the SRS trigger format set in the SRS trigger format setting section 2085. That is, the SRS setting section 2085 sets the SRS transmission content (whether or not there is an SRS trigger and part of the specific transmission conditions to transmits the SRS) to apply to the mobile terminal apparatus.

The downlink channel setting reporting section 208S controls reporting of predetermined bit information for the mobile terminal apparatus, selected in the SRS setting section 2085, using a downlink control channel. Also, the downlink channel setting reporting section 2086 is able to include and report predetermined bit information in one DCI format (an uplink scheduling grant or a downlink scheduling grant) in which information related to the SRS is defined, in a plurality of DCI formats for the downlink control channel, to the mobile terminal apparatus.

Figure 10:
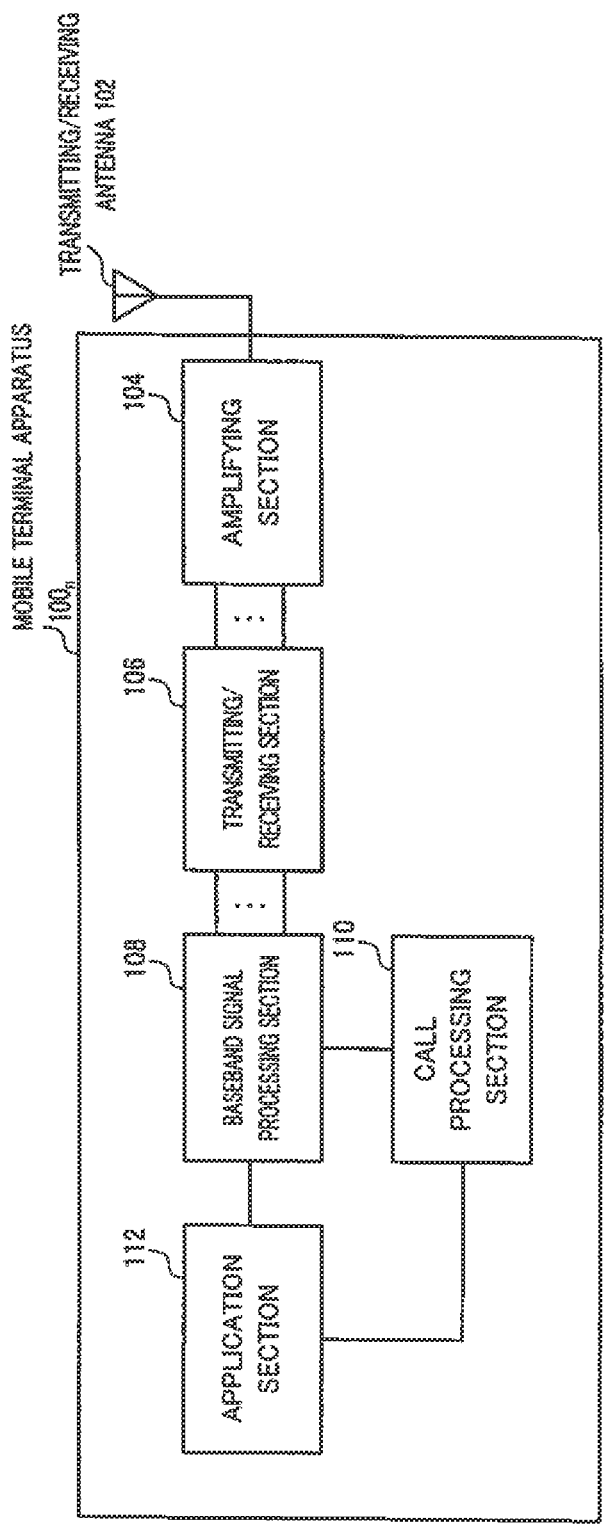
FIG. 10 is a block diagram showing an overall configuration of a mobile terminal apparatus according to an embodiment of the present invention.

Next, the functional configuration of the mobile terminal apparatus will be described with reference to FIG. 10. FIG. 10 is an example of a functional block diagram of a mobile terminal apparatus according to the present embodiment.

As shown in FIG. 10, the mobile terminal, apparatus 100$_n$ is configured to include a transmitting/receiving antenna 102, an amplification section 104 to correspond to transmitting/receiving antenna 102, a transmitting/receiving section 106, a baseband signal processing section 108, a call processing section 110, and an application section 112.

Uplink data is input in the baseband signal processing section 108, from the application section 112, In the baseband signal processing section 108, the retransmission control (H-ARQ (Hybrid ARQ)) process, scheduling, transport format selection, channel coding, transmission power setting and so on are performed, and the result is transferred to the transmitting/receiving section 106 per transmitting antenna. The transmitting/receiving section 106 performs frequency conversion of a baseband signal output from the baseband signal processing section 108, into a radio frequency signal. The signal having been subjected to frequency conversion is later amplified in the amplifying section 104 and transmitted from the transmitting/receiving antennas 102 per antenna.

Regarding downlink data, a radio frequency signal that is received in the transmitting/receiving antennas 102 is amplified in the amplifying section 104 such that the received power is corrected to certain power under AGC (Auto Gain Control). The amplified radio frequency signal is subjected to frequency conversion into a baseband signal, in the transmitting/receiving section 106. This baseband signal is subjected to predetermined processes (error correction, decoding, and so on) in the baseband signal, processing section 108, and later transferred to the call processing section 110 and application section 112. The call processing section 110 manages communication with the radio base station apparatus, and the application section 112 performs processes related to layers higher than the physical layer or the MAC layer.

Figure 11:
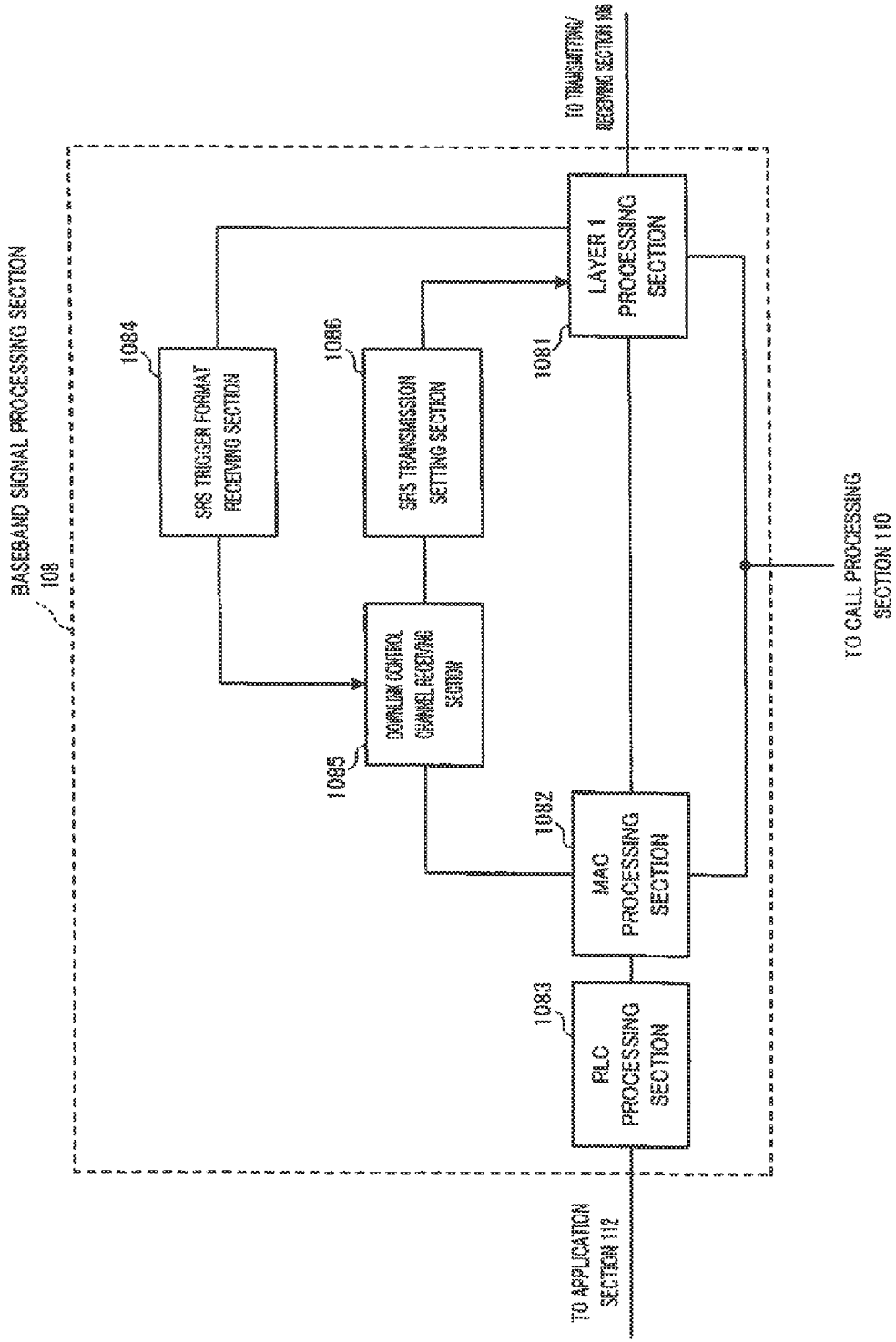
FIG. 11 is a diagram showing an example of a functional block diagram of a baseband signal processing section of a mobile terminal apparatus according to an embodiment of the present invention.
Figure 12:
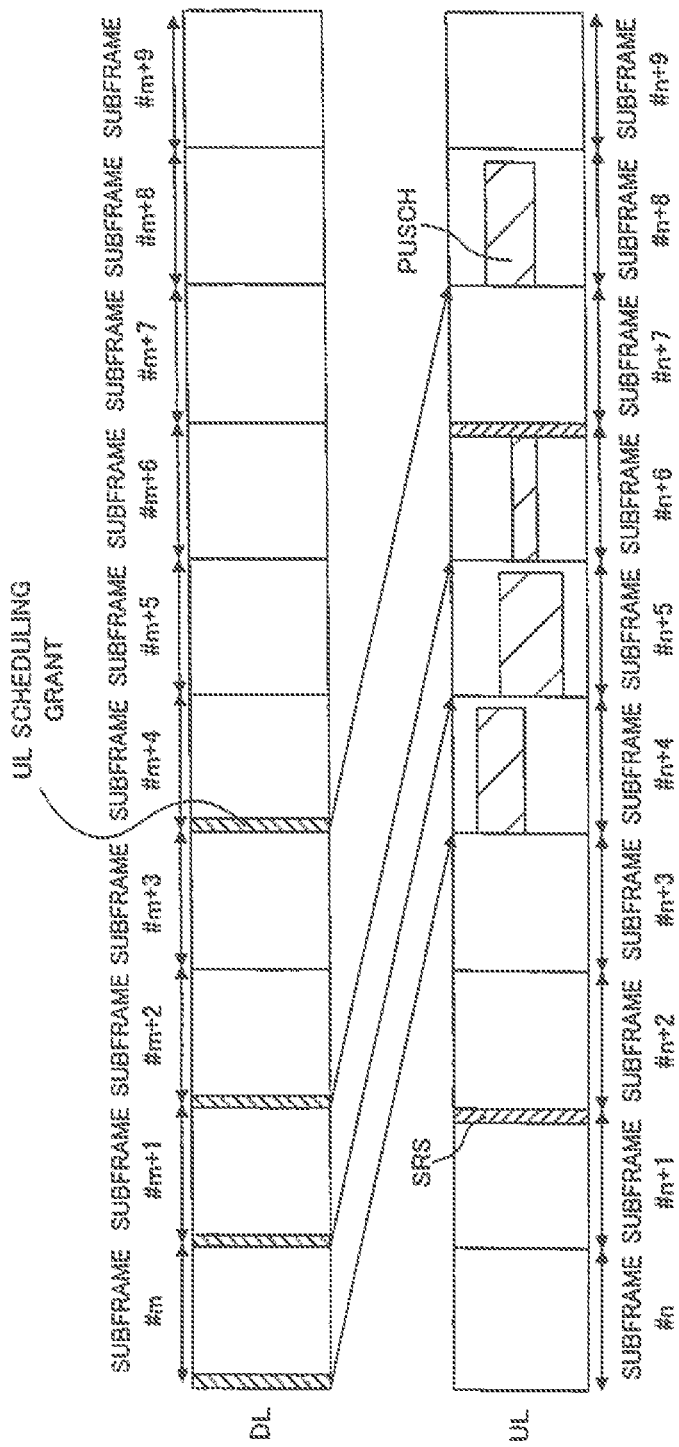
FIG. 12 is a diagram for explaining a conventional SRS transmission method in an LTE system.

Next, the functional configuration of the baseband processing section of the mobile terminal apparatus shown in above FIG. 10 will be described with reference to FIG. 11.

The baseband signal processing section 108 has a layer 1 processing section 1081, a MAC processing section 1082, an RLC processing section 1083, an SRS trigger format receiving section 1084, a downlink control channel receiving section 1085, and an SRS transmission setting section 1086.

The layer 1 processing section 1081 mainly performs processes related to the physical layer. The layer 1 processing section 1081, for example, performs processes for a signal that is received on the downlink, including channel decoding, a discrete Fourier transform (DFT), frequency demapping, an inverse Fourier transform (IFFT), data demodulation and so on. Also, the layer 1 processing section 1081 performs processes for a signal to transmit on the uplink, including channel coding, data modulation, frequency mapping and an inverse Fourier transform (IFFT).

The MAC processing section 1082 performs retransmission control in the MAC layer (HARQ), analysis of downlink scheduling information for the downlink (including specifying the PDSCH transport format and specifying the PDSCH resource blocks) and so on, for the signal received on the downlink. Also, the MAC processing section 1082 performs MAC retransmission control, analysis of uplink scheduling information (including specifying the PUSCH transport format and specifying the PUSCH resource blocks) and so on, for the signal to transmit on the uplink.

The RLC processing section 1083 performs packet division, packet combining, and retransmission control in the RLC layer and so on, with respect to packets received on the uplink and packets to transmit on the downlink received from the application section 112.

The SRS trigger format receiving section 1084 receives the SRS trigger format which is set in the radio base station apparatus and in which whether or not there is an SRS trigger and part of information related to SRS parameters are combined and defined as bit information. Also, the SRS trigger format can be received by RRC signaling and so on.

The downlink control channel receiving section 1085 receives predetermined bit information in which the SRS transmission content (whether or not there is an SRS trigger and SRS transmission conditions and so on) allocated to a downlink control channel is defined. Then, the SRS trigger format receiving section 1084 specifies SRS transmission content based on the SRS trigger format received.

The SRS transmission setting section 1086 controls SRS transmission based on the SES transmission content specified in the downlink control channel receiving section 1085. To be more specific, when the specified SRS transmission content is information not to transmit the SRS (that does not trigger the SRS), the SRS is not transmitted. On the other hand, when the specified SES transmission content is information to trigger the SRS, the SRS is transmitted based on the transmission conditions defined by the SRS parameters reported to the mobile terminal apparatus.

Note that although a configuration is shown here where SRS transmission content is specified in the downlink control channel receiving section 1085, it is equally possible to configure to specify SRS transmission content in the SRS transmission setting section 1086. In this case, the predetermined bit information that is received in the downlink control channel receiving section 1085 is supplied to the SRS transmission setting section 1086, and, in the SRS transmission setting section 1086, SRS transmission content is specified, and also SRS transmission is controlled.

Also, as shown in above embodiment 2, when combining and applying a periodic SRS and an aperiodic SRS, the SRS transmission setting section 1086 transmits the aperiodic SRS to the radio base station apparatus based on SRS transmission control information reported from the radio base station apparatus and also transmits the periodic SRS to the radio base station apparatus in a predetermined period. Furthermore, to prevent the transmission timings of the periodic SRS and the aperiodic SRS from colliding, when the transmission timings of the periodic SRS and the aperiodic SRS overlap in the same subframe, the SRS transmission setting section 1086 preferentially transmits either one of the SRSs. Alternately, the SRS transmission setting section 1086 sets the transmission timings of the periodic SRS ad the aperiodic SRS in different subframes.

Also, the embodiments disclosed herein are only examples in all respects, and are by no means limited to these embodiments. The scope of the present invention is defined not only by the descriptions of the above embodiments and also is set by the claims, and covers all the modifications and alterations within the meaning and range equivalent to the claims.

The invention claimed is:

1. A radio communication method for a radio base station apparatus that controls transmission of an aperiodic SRS (Sounding Reference Signal) by a mobile terminal apparatus, the radio communication method comprising:
    selecting a specific bit information piece to report to the mobile terminal apparatus, from a table having four hit information pieces including one bit information piece to indicate not to trigger the aperiodic SRS and three bit information pieces to indicate to transmit the aperiodic SRS using first to third default SRS parameters respectively, the four bit information pieces ail being defined in a 2-bit bit field in downlink control information to be transmitted in one subframe; and
    transmitting, to the mobile terminal apparatus, the first to third default SRS parameters by higher layers and the specific bit information piece by a downlink control channel.

2. The radio communication method according to claim 1, wherein the specific bit information piece is included in a DCI format of the downlink control channel and reported to the mobile terminal apparatus.

3. The radio communication method according to claim 2, wherein the DCI format comprises at least a first DCI format and a second DCI format set therein and the default SRS parameter is common to tables corresponding respectively to the first DCI format and the second DCI format.

4. The radio communication method according to claim 2, wherein the DCI format is an uplink scheduling grant or a downlink scheduling grant.

5. The radio communication method according to claim 2, wherein at least two tables, between which the number of bits differs, are set in the DCI format, in which selection information of any of the first to third default SRS parameters is set in a table of a smaller number of bits, a difference from the default SRS parameter is set in a table of a larger number of bits, one of the table of the smaller number of bits and the table of the larger number of bits is selected based on a given condition.

6. A radio communication method for a mobile terminal apparatus that transmits an aperiodic SRS (Sounding Reference Signal), the radio communication method comprising:
    receiving a specific bit information piece selected from a table having four bit information pieces including one bit information piece to indicate not to trigger the aperiodic SRS and three bit information pieces to indicate to transmit the aperiodic SRS using first to third default SRS parameters respectively, the four bit information pieces ail being defined in a 2-bit bit field in downlink control information to be transmitted in one subframe; and controlling transmission of the aperiodic SRS based on the specific bit information piece and the first to third default SRS parameters given in advance by higher layers.

\* \* \* \* \*